US012399066B2

(12) United States Patent
Choi

(10) Patent No.: US 12,399,066 B2
(45) Date of Patent: Aug. 26, 2025

(54) OPTICAL FIBER CABLE TEMPERATURE MEASUREMENT DEVICE

(71) Applicant: LS ELECTRIC CO., LTD., Anyang-Si (KR)

(72) Inventor: Hyungsuk Choi, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 670 days.

(21) Appl. No.: 17/756,886

(22) PCT Filed: Nov. 11, 2020

(86) PCT No.: PCT/KR2020/015734
§ 371 (c)(1),
(2) Date: Jun. 3, 2022

(87) PCT Pub. No.: WO2021/112422
PCT Pub. Date: Jun. 10, 2021

(65) Prior Publication Data
US 2022/0412810 A1  Dec. 29, 2022

(30) Foreign Application Priority Data
Dec. 5, 2019  (KR) .................. 10-2019-0161001
May 26, 2020  (KR) .................. 10-2020-0063237

(51) Int. Cl.
*G01K 1/143*  (2021.01)
*G01K 11/3206*  (2021.01)
(Continued)

(52) U.S. Cl.
CPC .......... *G01K 1/143* (2013.01); *G01K 11/3206* (2013.01); *G01K 11/324* (2021.01); *H01M 10/486* (2013.01)

(58) Field of Classification Search
CPC .. G01K 1/143; G01K 11/324; G01K 11/3206; H01M 10/486
See application file for complete search history.

(56) References Cited

U.S. PATENT DOCUMENTS 5,913,976 A  6/1999  Patton et al.
2005/0213867 A1  9/2005  Rajendran et al.
(Continued)

FOREIGN PATENT DOCUMENTS

CN  105789525 A  * 7/2016  ........ H01M 10/4235
CN  207263336 U   4/2018
(Continued)

OTHER PUBLICATIONS

International Search Report for related International Application No. PCT/KR2020/015734; report dated Jun. 10, 2021; (5 pages).
(Continued)

*Primary Examiner* — Mirellys Jagan
(74) *Attorney, Agent, or Firm* — K&L Gates LLP

(57) ABSTRACT

The present invention relates to an optical fiber cable temperature measurement device, and more particularly, an optical fiber cable temperature measurement device that is applied to a multi-stage power device module such as a battery storage device. An optical fiber cable temperature measurement device according to an embodiment of the present invention is applied to a power device including a plurality of power device modules, and comprises: optical fiber cable measurement units that are provided in the respective power device modules; optical fiber cables inserted and installed in the respective optical fiber cable measurement units; and a control unit that is connected to one end of the optical fiber cables to measure the temperature.

22 Claims, 15 Drawing Sheets

(51) Int. Cl.
    *G01K 11/324*    (2021.01)
    *H01M 10/48*     (2006.01)

(56)            References Cited

U.S. PATENT DOCUMENTS

2010/0080501 A1    4/2010   Saunders et al.
2010/0135355 A1*   6/2010   Hermann ............... G08B 17/06
                                                        374/161

FOREIGN PATENT DOCUMENTS

CN       207351583 U      5/2018
CN       207379631 U      5/2018
CN       109883569 A      6/2019
CN       110127253 A  *   8/2019
DE    102011002841 A1 *   7/2012   ............ H01M 10/30
JP        03013831 A      1/1991
JP       H11211918 A      8/1999
JP         5312346 B2    10/2013
KR       100812742 B1     3/2008
KR       101245285 B1     3/2013
KR      20150017366 A     2/2015
KR      20150065280 A     6/2015
KR       101625327 B1     5/2016
WO      2004048889 A1     6/2004
WO   WO-2013054734 A1 *   4/2013   ......... G01D 5/35316
WO   WO-2016169702 A1 *  10/2016   ............. G01K 11/12

OTHER PUBLICATIONS

Office Action for related Chinese Application No. 202080080755.0; action dated Feb. 22, 2025; (13 pages).

* cited by examiner

OPTICAL FIBER CABLE TEMPERATURE MEASUREMENT DEVICE

CROSS-REFERENCE TO RELATED APPLICATIONS

This application is the National Stage filing under 35 U.S.C. 371 of International Application No. PCT/KR2020/015734, filed on Nov. 11, 2020, which claims the benefit of earlier filing date and right of priority to Korean Application Nos. 10-2019-0161001, filed on Dec. 5, 2019, 10-2020-0063237, filed on May 26, 2020, the contents of which are all hereby incorporated by reference herein in their entirety.

FIELD

The present disclosure relates to an optical fiber cable temperature measurement device, and more particularly, to an optical fiber cable temperature measurement device that is applied to a multi-stage power device module such as a battery storage device.

BACKGROUND

Generally, an energy storage system (ESS) refers to a device that stores energy using a physical medium. Energy storage is largely divided into physical energy storage and chemical energy storage according to a storage method. Typical physical energy storage includes pumping-up power generation, compressed air storage, and a flywheel etc., and the chemical energy storage mainly uses batteries, such as lithium-ion batteries, lead acid batteries, and sodium-sulfur (NaS) batteries.

As an example of an energy storage device, battery type ESS is called BESS (Battery Energy Storage System), and in general, ESS means BESS.

Energy storage devices using batteries generate much heat, so it is important to manage heat to prevent fires. To this end, the energy storage device is usually provided with a temperature sensor therein.

Referring to FIG. 1, an energy storage device (ESS) according to the related art will be described. An energy storage device using batteries usually comprises cells, modules, or racks. Certification of energy storage devices is done on a per-rack basis. The energy storage device using batteries is built in the form of a rack 1. The rack 1 is composed of battery modules 2 stacked in multiple stages on a cabinet-type structure made of beams or iron plates. Here, each battery module 2 is a combination of multiple battery cells (not shown). Each battery module 2 usually has a temperature sensor (not shown) inside for measuring their own temperatures.

However, when the temperature sensor breaks down, the temperature measurement of the battery module 2 is not possible. Also, measuring temperatures in the space between adjacent battery modules 2 is not possible either since the temperature sensor is provided inside the battery module 2. That is, temperature management for the rack 1 is not done because temperature measurement around the battery module 2 is not done.

SUMMARY

The present disclosure has been devised to solve the above problems, and an object of the present disclosure is to provide an optical fiber cable temperature measurement device capable of measuring temperatures around a multi-stage power device module.

Another object of the present disclosure is to provide an optical fiber cable temperature measurement device capable of measuring each of power device modules arranged in multiple stages.

Another object of the present disclosure is to provide an optical fiber cable temperature measurement device that is easy to assemble.

Another object of the present disclosure is to manage the heat of an energy storage device by measuring temperatures around a battery module of the multi-stage energy storage device.

To achieve these and other advantages and in accordance with the purpose of the present invention, as embodied and broadly described herein, there is provided an optical fiber cable temperature measurement device comprising: a power device provided with a plurality of power device modules; a plurality of optical fiber cable measurement units that are provided in the respective power device modules; optical fiber cables inserted and installed in the respective optical fiber cable measurement units; and a control unit that is connected to one end of the optical fiber cables to measure temperatures.

The optical fiber cable measurement units each comprise a cable mount where the optical fiber cable is inserted and mounted.

The cable mount comprises a mount body built in the shape of a rectangular frame and a crossbar disposed across the mount body.

The cable mount has a plurality of openings.

The mount body comprises a pair of horizontal bars disposed in parallel and a pair of vertical bars disposed in parallel.

The crossbar is disposed in the middle part of the pair of horizontal bars.

The mount body has a stopper that keeps the cable mount from entering when inserted into the power device module.

A plurality of cable fixing grooves are formed on a lower surface of the crossbar, for fixing the optical fiber cable.

A side cross-section of the cable fixing grooves is shaped like a segment of a circle.

The cable fixing grooves are formed on the vertical bars.

The cable fixing grooves formed on the crossbar are parallel to the horizontal bars, and the cable fixing grooves formed on the vertical bars are slanted from the horizontal bars.

The cable mount comprises an upper cable mount built in the form of a frame and a lower cable mount built in the form of a frame, corresponding to the upper cable mount.

The upper cable mount and the lower cable mount are held together in such a way as to swing relative to each other.

Positional marks where the optical fiber cable is mounted are formed on the lower cable mount or the upper cable mount.

The optical fiber cable temperature measurement device comprises an upper panel member and a lower panel member, and the optical fiber cable is inserted and installed between the upper panel member and the lower panel member.

The optical fiber cable temperature measurement device further comprises a connector coupled to both ends of the optical fiber cable and exposed out of the upper panel member and the lower panel member.

The upper panel member and the lower panel member are made of a thin plate or a film.

The upper panel member or the lower panel member has an insertion groove formed therein where the optical fiber cable is inserted and installed, wherein the insertion groove has a straight portion or a curved portion.

The radius of curvature of the curved portion is 20 times as large as or larger than the diameter of the optical fiber cable.

The optical fiber cable temperature measurement device further comprises a connecting cable for connecting the control unit and the connector or connecting the connectors of adjacent battery modules.

The optical fiber cable temperature measurement device further comprises mounting plate installation parts that are formed as grooves on the upper panel member and the lower panel member and inserted into the mounting plate installation parts.

The mounting plate has a wiring groove formed around the circumference in such a way the optical fiber cable is wound thereabout.

The battery module is divided into a plurality of sections, and measurement points are set on the optical fiber cable at predetermined distances from the connector.

According to an optical fiber cable temperature measurement device according to an embodiment of the present disclosure, it is possible to facilitate temperature measurement for a power device and thermal control by an optical fiber cable measurement unit provided for each power device module.

Moreover, the optical fiber cable temperature measurement device may be applied for each power device module configured in multiple stages, by means of optical fiber cable measurement units.

Furthermore, the optical fiber cable temperature measurement device is provided in the form of optical fiber cable measurement units where the fiber-optic cable is mounted, and therefore may be easily assembled and installed in a power device.

Furthermore, the optical fiber cable measurement units make measurements on a per-sheet or per-plane basis, thereby enabling effective control of temperatures between battery modules.

Furthermore, the optical fiber cable measurement units allow for measurement using a fiber-optic cable that is inserted and laid between films (upper and lower panels) that are tightly held together, and therefore provides high measurement accuracy and enables conversion into measurement positions based on distance, thereby facilitating the arrangement and control of the measurement points.

Since the fiber-optic cable is laid on a film surface with a predetermined area, it is possible to secure a radius of curvature required for measurement.

Since the fiber-optic cable is installed in an installation groove or a mounting plate formed (placed) on the film surface, a standardized temperature measurement position distribution can be configured, thereby allowing for efficient temperature management.

Since the upper and lower panels may work in one direction by using an insulating/non-insulating film, the directionality of temperature measurement can be achieved.

Since temperature measurement is possible with respect to a connector provided for each optical fiber cable measurement unit. Thus, measurements may be made at the same points on the upper surfaces of battery modules even if the gap between the battery modules varies.

DETAILED DESCRIPTION

Figure 1:
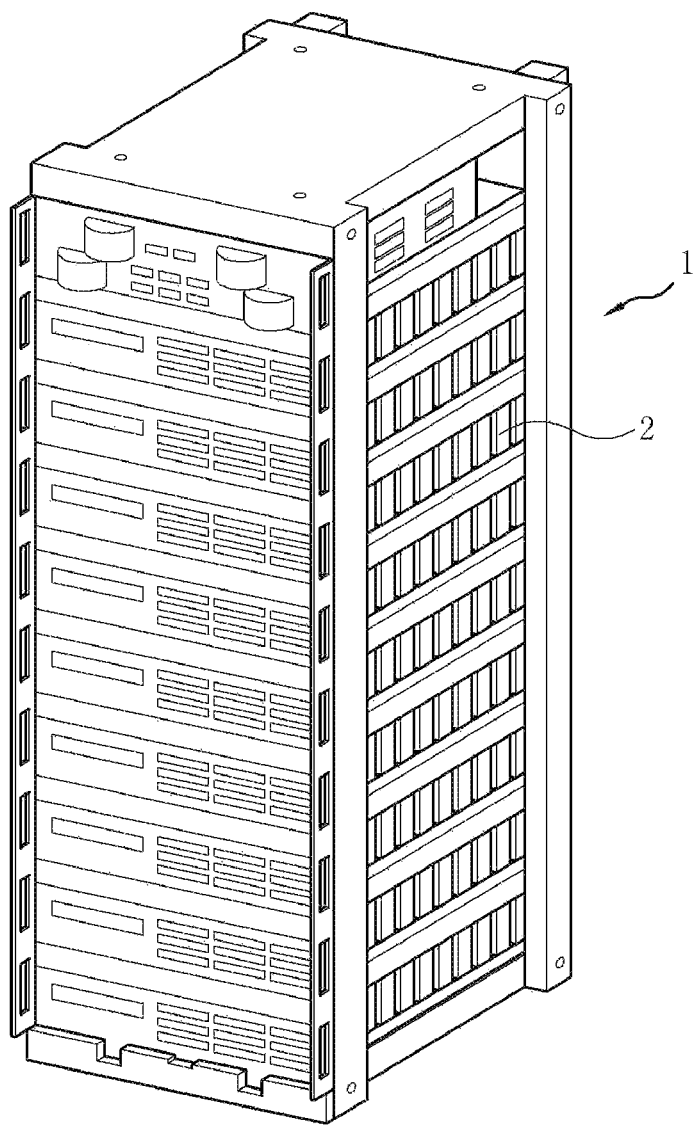
FIG. 1 is a perspective view of a power device according to the related art.

Hereinafter, preferred embodiments of the present disclosure will be described in detail below with reference to the accompanying drawings. This is intended to describe the present disclosure in detail so that those having ordinary knowledge in the art to which the present disclosure pertains can easily practice the present disclosure, but does not mean that the technical spirit and scope of the present disclosure are limited by the above embodiments.

An optical fiber cable temperature measurement device according to each of the embodiments of the present disclosure will be described in detail with reference to the drawings.

First Embodiment

An optical fiber cable temperature measurement device according to an embodiment of the present disclosure includes: a power device 10 provided with a plurality of power device modules 20; a plurality of optical fiber cable measurement units 130 that are provided in the respective power device modules 20; optical fiber cables 40 inserted and installed in the respective optical fiber cable measurement units 130; and a control unit 60 that is connected to one end of the optical fiber cables 40 to measure temperatures.

The power device 10 is provided. The power device 10 may be configured in the form of a rack 11 so that a plurality of power device modules 20 can be installed in multiple stages. The rack 11 may include an upper plate and a lower plate and a frame connected between the upper plate and the lower plate to support them. A plurality of power device modules 20 are installed in multiple stages in the rack 11. Here, an example of the power device may include an energy storage device. In addition, an example of the power device modules may include battery modules.

Figure 2:
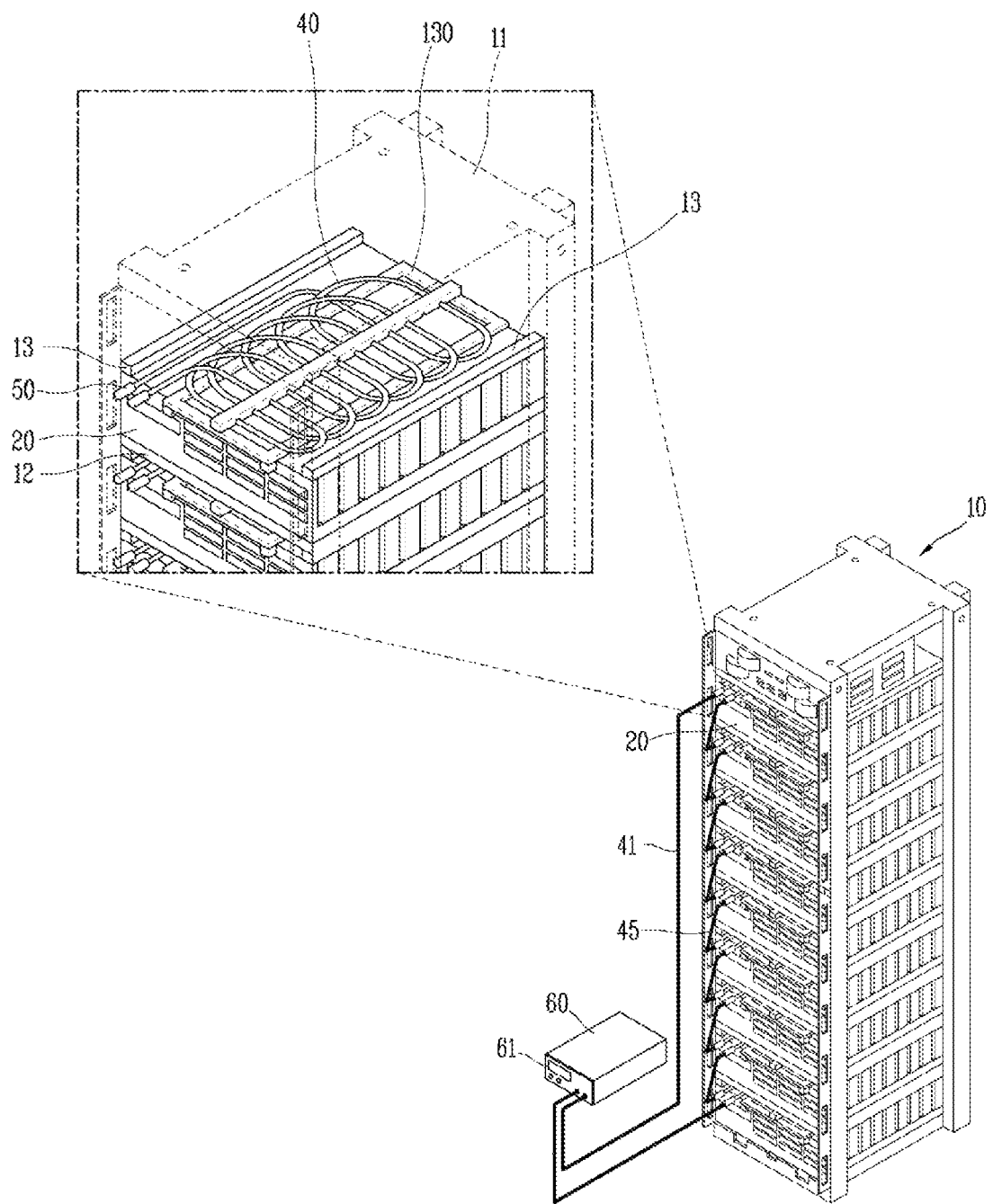
FIG. 2 is a perspective view of a power device with an optical fiber cable temperature measurement device according to an embodiment of the present disclosure.

The power device 10 is shown in FIG. 2. The power device 10 is configured in the form of a rack as described above.

A plurality of support plates 12 are provided in the rack 11 so that each power device module 20 is installed and supported on them.

In addition, the rack 11 is provided with a support plate 13 so that the optical fiber cable measurement units 130 are installed on it. The support plate 13 may be provided above or below each power device module 20. Accordingly, the optical fiber cable measurement units 130 may be inserted and installed between the power device modules 20 and the support plate 13.

Figure 3:
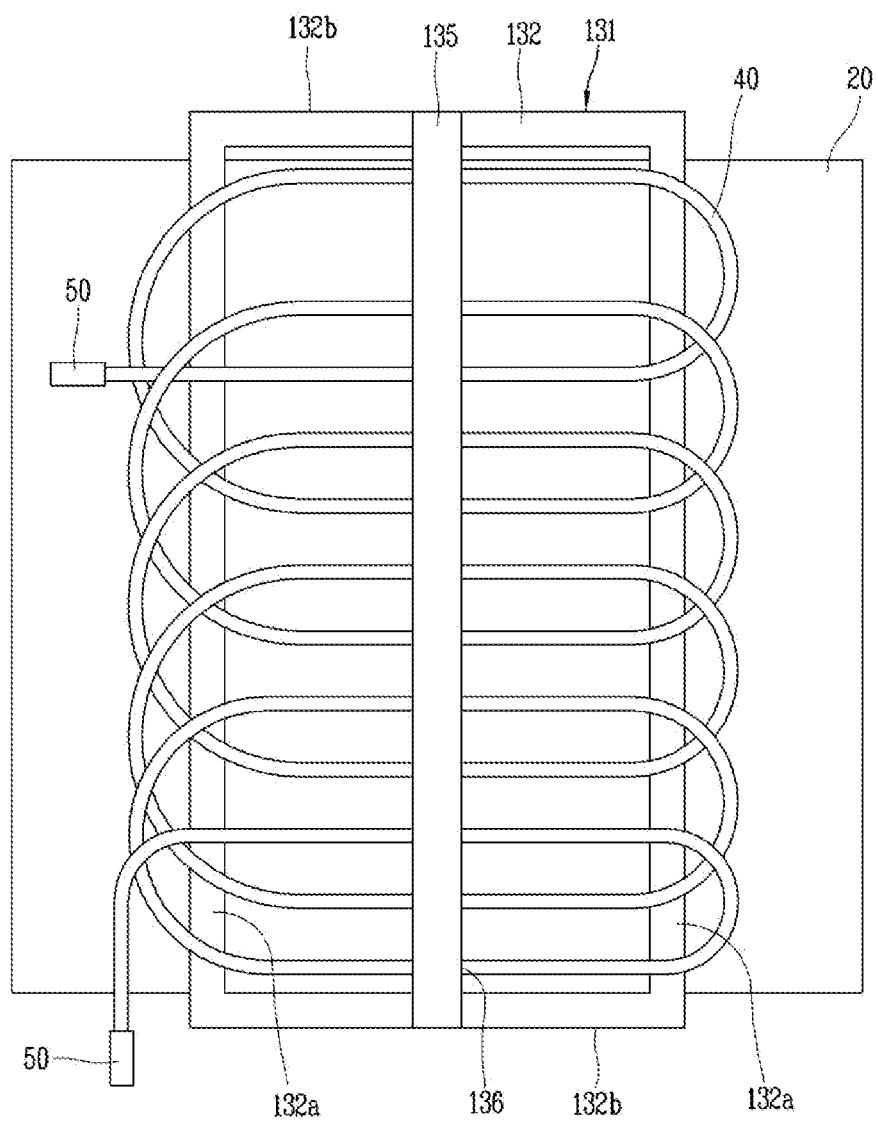
FIG. 3 is a plan view of the optical fiber cable temperature measurement device being installed on any one of power device modules in FIG. 2.
Figure 4:
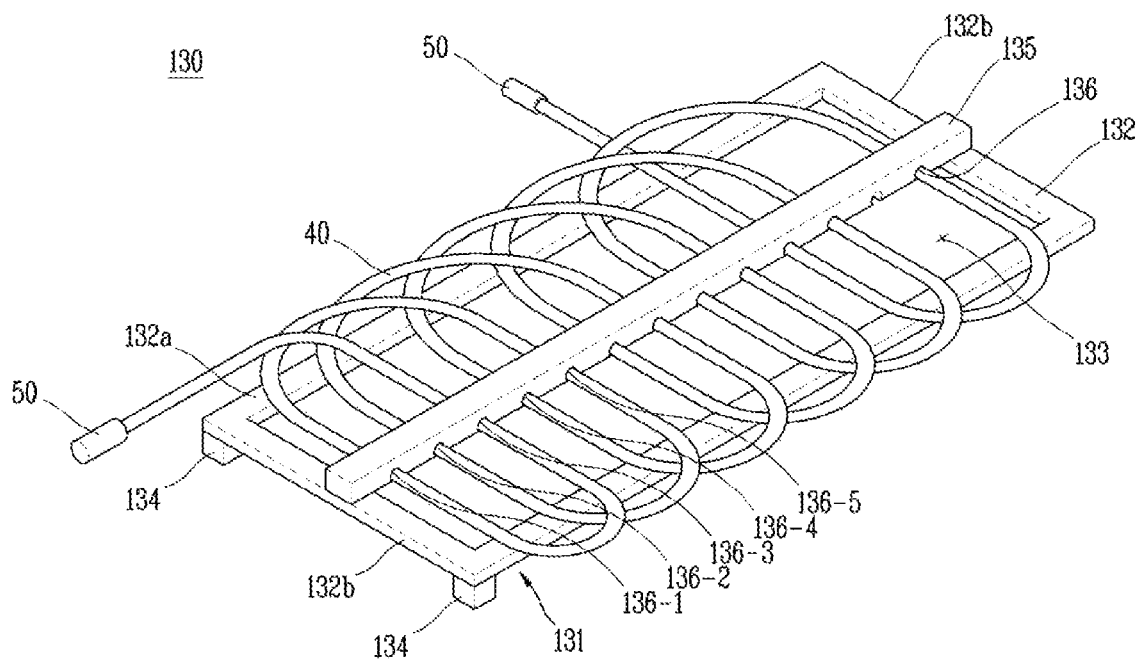
FIG. 4 is a perspective view of an optical fiber cable measurement unit according to an embodiment of the present disclosure.
Figure 5:
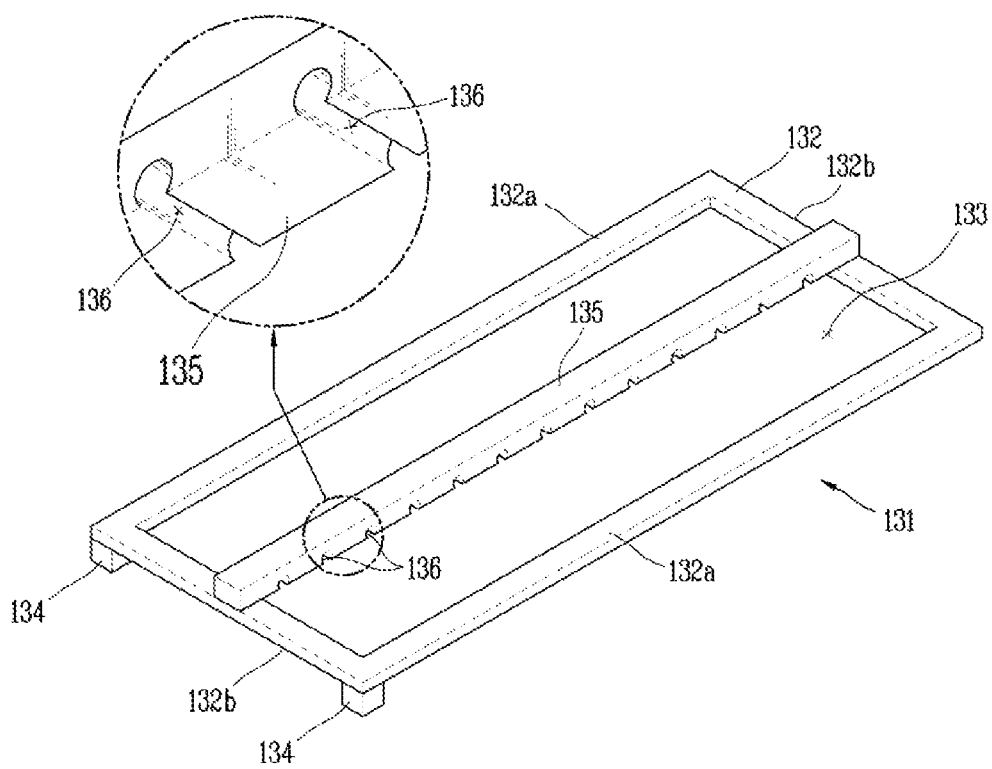
FIG. 5 is a perspective view of the optical fiber cable measurement unit in FIG. 4.

An optical fiber cable measurement unit 130 is shown in FIGS. 3 and 4. Also, a cable mount 131 is shown in FIG. 5. The optical fiber cable measurement unit 130 is provided to measure the temperature in the space between the power device module 20 and an adjacent power device module 20. The optical fiber cable measurement unit 130 is disposed in such a way as to have surface contact with one surface (e.g., upper surface) of the power device module 20 or to have a predetermined gap with it, to measure the surface temperature of the power device module 20 or the temperature in the space between power device modules 20.

The optical fiber cable measurement unit 130 may include a cable mount 131, a fiber-optic cable 40, and a connector 50.

The cable mount 131 is provided. The cable mount 131 includes a mount body 132 built in the shape of a frame and a crossbar 135 disposed across the mount body.

The mount body 132 may be made of synthetic resin or metal. In this case, the mount body 132 is preferably made of a material having high thermal resistance and high thermal conductivity. Accordingly, the mount body 132 helps to dissipate heat from the power device module 20 while in contact with the upper surface of the power device module 20.

The mount body 132 is built in the form of a polygonal (e.g., rectangular) frame. That is, the mount body 132 is mostly an opening 133, except for the outer part. The opening 133 reduces the area of the power device module 20 covered by the mount body 132 and provides good air ventilation.

The mount body 132 may be part of a plain plate. Alternatively, the mount body 132 may be formed by bending a bar or a long plain plate.

The mount body 132 provides good air ventilation because of the opening 133. When viewed from the top, the opening 133 covers most of the area of the mount body 132, and therefore the thermal resistance the power device module 20 gets from the mount body 132 is minimized.

The mount body 132, if built as a rectangular frame, includes a pair of horizontal bars 132b disposed in parallel and a pair of vertical bars 132a disposed in parallel.

The horizontal bars 132b are preferably smaller than the width, i.e., horizontal length, of the power device module 20.

The vertical bars 132a may be larger than the depth, i.e., vertical length, of the power device module 20.

The mount body 132 has a stopper 134 that keeps the cable mount 131 from entering when inserted into the power device module 20. The stopper 134 may protrude downward from both ends of the lower horizontal bar 132b.

The mount body 132 is provided with a crossbar 135. The crossbar 135 may be disposed between the upper horizontal bar 132b and the lower horizontal bar 132b. For example, the crossbar 135 may be disposed between the middle of the upper horizontal bar 132b and the middle of the lower horizontal bar 132b.

A plurality of cable fixing grooves 136 are formed on a lower surface of the crossbar 135. The cable fixing grooves 136 are formed widthwise on the lower surface of the crossbar 135.

A side cross-section of the cable fixing grooves 136 is shaped like a segment of a circle. Inlets of the cable fixing grooves 136 may be smaller than the diameter of the fiber-optic cable 40. This keeps the fiber-optic cable 40 from falling out of the cable fixing grooves 136 after being force-fitted into the cable fixing grooves 136.

The fiber-optic cable 40 is provided. The fiber-optic cable 40 is inserted and installed between the mount body 132 and the crossbar 135. The fiber-optic cable 40 is laid over the mount body 132. The fiber-optic cable 40 is laid in such a way as to be wound or bent between the mount body 132 and the crossbar 135. That is, the fiber-optic cable 40 is laid in such a way that one cable is continuously wound. The fiber-optic cable 40 may overlap when bent.

As such, the temperature around the power device module 20 may be measured through the fiber-optic cable 40 laid on the cable mount 131. As the fiber-optic cable 40 is a line, it may have a plurality of measurement points when laid on the surface of the cable mount 131.

Temperature measurement using fiber-optic cables is conventionally employed in temperature measurement in conventional power underground lines and oil pipelines for refined oil and petrochemicals in the conventional art, which is also called Distributed Temperature Sensing (DTS).

Distributed temperature sensing uses the proportional relationship between temperature and wavelength, which is one of the unique characteristics of optical fibers.

There are three types of scatterings waves reflected from quartz from which optical fibers are made: Rayleigh-scattering waves, Raman-scattering waves, and Brillouin-scattering waves. Among them, the Raman waves represent a wavelength that is directly proportional to temperature. Using this, temperatures can be measured (measured wavelengths can be converted into temperatures depending on the amplitude). Since optic-fiber cables are linear, temperature measurement can be done by measuring the distance of each scattering frequency from a reference position (or by measuring each scattering frequency for each distance).

Temperature measurement using fiber-optic cables can be done at a resolution of 0.01° C. per 1 m. Also, temperature measurement can be done at intervals of 0.5 m or more for meaningful analysis of scattering waves.

Accordingly, the fiber-optic cable 40 is laid in a bent shape to ensure that a plurality of measurement points are provided within the limited area of an upper portion of the power device module 20.

The fiber-optic cable 40 is laid on the vertical bars 132a of the mount body 132 and fixed to the cable fixing grooves 136 of the crossbar 135.

An example of a method of installing the fiber-optic cable 40 on the mount body 132 will be described below. As the fiber-optic cable 40 is wound either clockwise or counterclockwise, it moves forward in one direction of the crossbar 135. The fiber-optic cable 40 may be disposed in such a way that it is wound multiple times in the form of a spring and then collapsed to one side. The fiber-optic cable 40 may be wound in an elliptical shape.

The fiber-optic cable 40 is laid on a pair of vertical bars 132a. That is, the horizontal width (diameter) across which the fiber-optic cable 40 is wound may be longer than the horizontal bars 132b.

The fiber-optic cable 40 may be disposed in such a way as to overlap each other as it is wound. That is, referring to FIGS. 3 to 5, the fiber-optic cable 40 may be fitted into the cable fixing grooves 136 in an alternating manner. Suppose that the cable fixing grooves 136 are referred to as a first cable fixing groove 136-1, a second cable fixing groove 136-2, . . . , and an n-th cable fixing groove 136-n, in the order of closest to the lower horizontal bar 132b. Then, the fiber-optic cable 40 fixed to the cable fixing grooves 136 may be fitted in the order of the third cable fixing groove 136-3, the first cable fixing groove 136-1, the fifth cable fixing groove 136-5, the second cable fixing groove 136-2, the seventh cable fixing groove 136-7, the fourth cable fixing groove 136-4, the ninth cable fixing groove 136-9, the sixth cable fixing groove 136-6, . . . . From a second turn and onward of the fiber-optic cable 4, the rule of alternation between moving 5 grooves forward and moving 3 grooves backward applies toward the upper end of the crossbar 135.

The fiber-optic cable 40 is a cable that is installed on the cable mount 131 as it is wound multiple times.

The connector 50 is connected to the front and rear ends of the fiber-optic cable 40. Thus, one optical fiber cable measurement unit 130 is completed.

The connector 50 is provided on both ends of the fiber-optic cable 40. As the connector 50 is provided on each panel member 31 and 35, the optical fiber cable measurement units 130 may be provided as separate units. Also, the connector 50 may be set as a reference point for temperature measurement (wavelength measurement). Accordingly, it may be set as a reference point of each optical fiber cable measurement unit 130.

A connecting cable 41 and 45 is provided to connect the control unit 60 and the connector 50 or two adjacent connectors 50. The optical fiber cable measurement units 130 may be interconnected by the connecting cable 45.

The control unit 60 may be configured as a DTS server. The control unit 60 is provided to provide wavelength measurements in the fiber-optic cable 40 and convert them into temperatures.

A proper operating temperature may be set on the control unit 60, and an indication or an alert may be issued if this temperature is out of a limited temperature range. For example, a display unit 61 may be provided on a portion of the server of the control unit 60.

Second Embodiment

Figure 6:
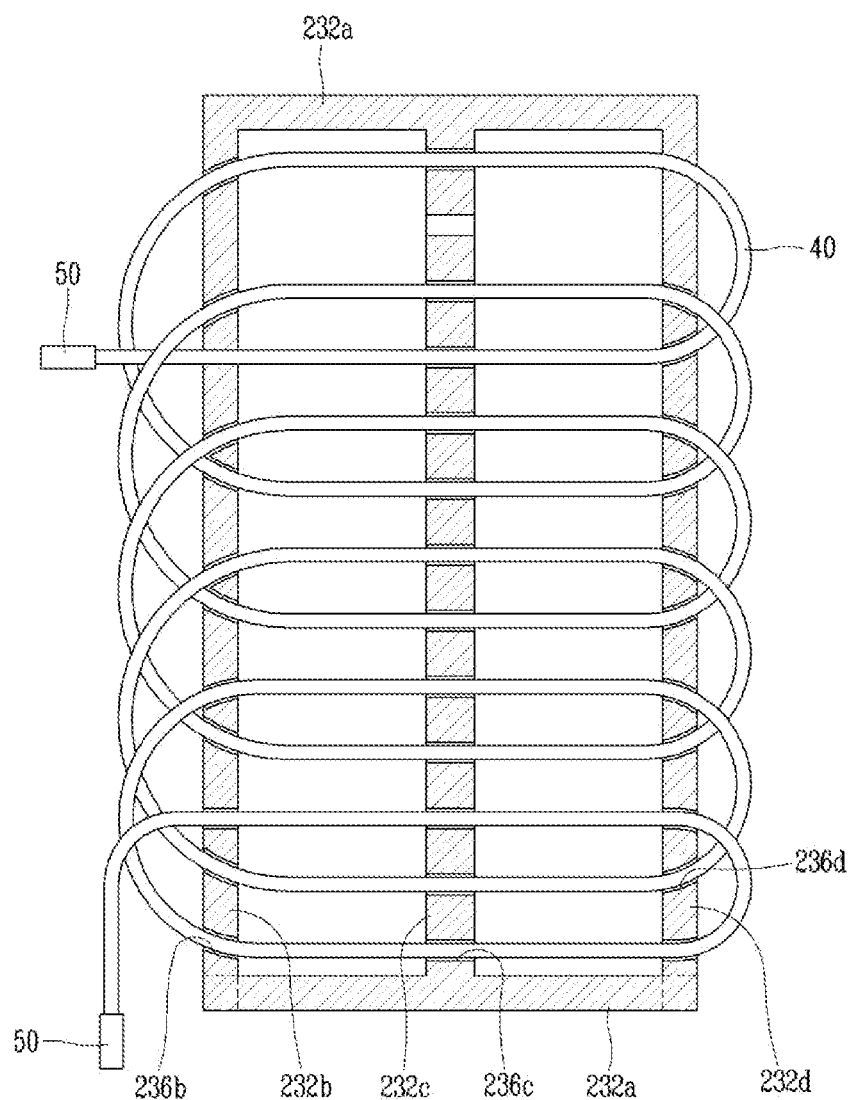
FIG. 6 is a bottom view of an optical fiber cable temperature measurement device according to another embodiment of the present disclosure.
Figure 7:
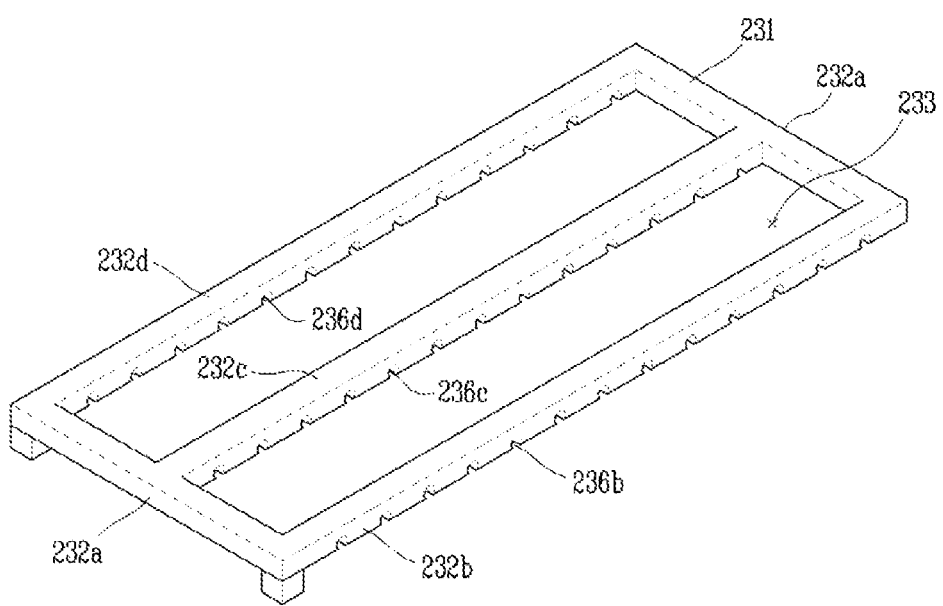
FIG. 7 is a perspective view of the optical fiber cable measurement unit in FIG. 6.

FIGS. 6 and 7 illustrate an optical fiber cable temperature measurement device according to another embodiment of the present invention. FIG. 6 is a bottom view of an optical fiber cable measurement unit according to a second embodiment, and FIG. 7 is a perspective view of a cable mount.

The optical fiber cable temperature measurement device includes: a power device 10 provided with a plurality of power device modules 20; a plurality of optical fiber cable measurement units 230 that are provided in the respective power device modules 20; optical fiber cables 40 inserted and installed in the respective optical fiber cable measurement units 230; and a control unit 60 that is connected to one end of the optical fiber cables 40 to measure temperatures.

In this embodiment, differences from the previous embodiment will be described.

The optical fiber cable measurement unit 230 includes a cable mount 231 and a fiber-optic cable 40. The cable mount 231 is built in the shape of a frame with an opening 233. For example, FIGS. 6 and 7 illustrate a cable mount 231 built in the form of a rectangular frame.

The cable mount 231 have a plurality of openings 233. For example, the cable mount 231 includes two horizontal bars 232a and three vertical bars 232b, 232c, and 232d, with two openings 233 formed therein.

The vertical bars 232b, 232c, and 232d may be divided into side vertical bars 232b and a center vertical bar 232c. Cable fixing grooves 236b, 236c, and 236d are respectively formed on the lower surfaces of the vertical bars 232b, 233c, and 232d.

The fiber-optic cable 40 is fixed by being fitted to the cable fixing grooves 236b, 236c, and 236d. The fiber-optic cable 40 may be wound in such a way that it is fitted sequentially to the cable fixing groove 236b of one side vertical bar 232b, the cable fixing groove 236c of the center vertical bar 232c and then moved up and fitted sequentially to the cable fixing groove 236d of the other side vertical bar 232d, the cable fixing groove 236c of the center vertical bar 232c, and the cable fixing groove 236b of the one vertical bar 232b.

Here, the cable fixing grooves 236c of the center vertical bar 232c are parallel to the horizontal bars, and the cable fixing grooves 236b and 236d of the side vertical bars 232b and 232d are slanted from the horizontal bars.

The cable fixing grooves 236b and 236d of the side vertical bars 232b and 232d may be arranged in consecutive pairs of cable fixing grooves facing each other in a wedge-like pattern. Here, the cable fixing grooves 236b of the one side vertical bar 232b and the cable fixing grooves 236d of the other side vertical bar 232d may be formed at different elevations.

In this embodiment, the cable fixing grooves are formed on each of the vertical bars, thereby fixing and holding the fiber-optic cable 40 steady in place.

Third Embodiment

Figure 8:
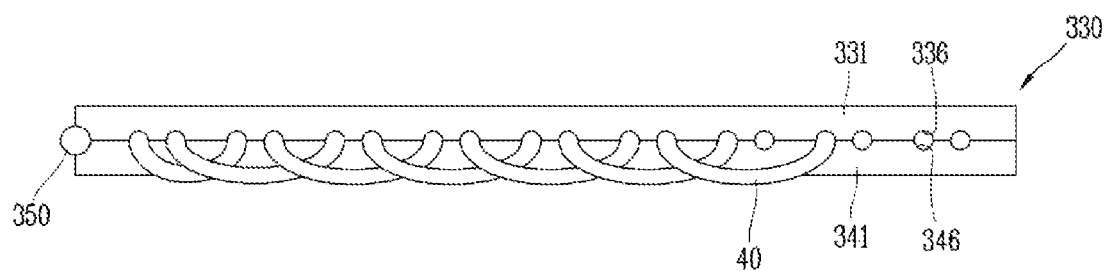
FIG. 8 is a side view of an optical fiber cable measurement unit according to yet another embodiment of the present disclosure.
Figure 9:
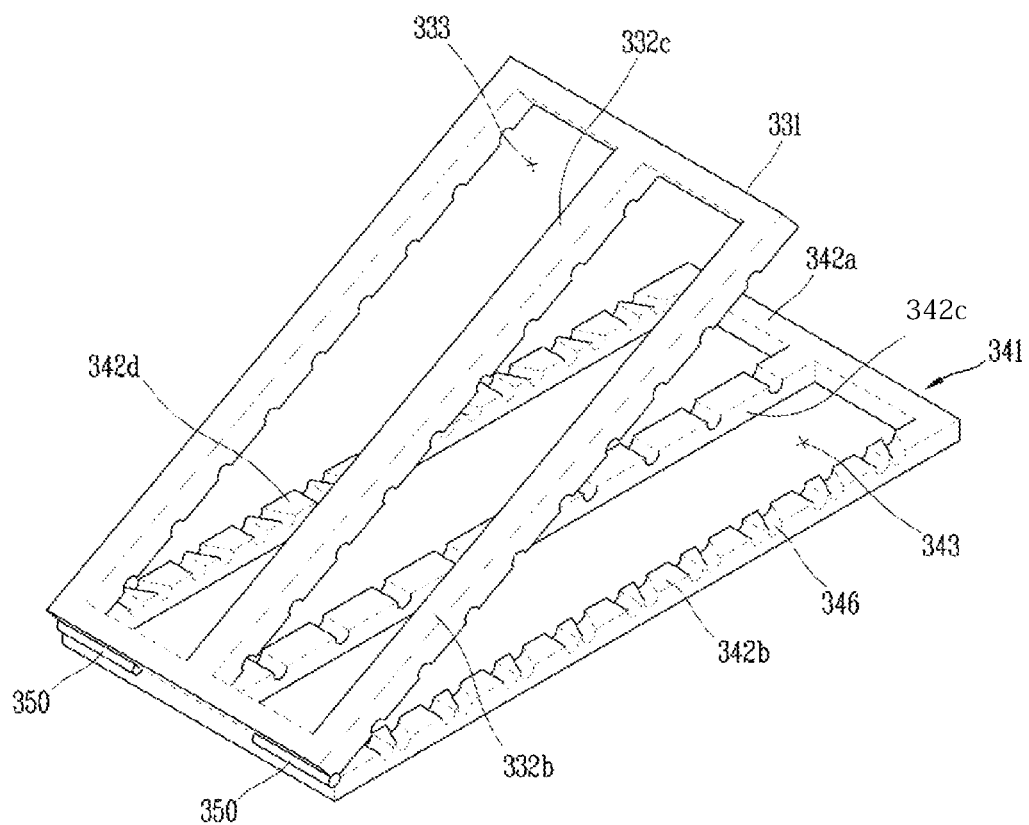
FIG. 9 is a perspective view of the optical fiber cable measurement unit in FIG. 8.

FIGS. 8 and 9 illustrate an optical fiber cable temperature measurement device according to yet another embodiment of the present disclosure.

The optical fiber cable temperature measurement device includes: a power device 10 provided with a plurality of power device modules 20; a plurality of optical fiber cable measurement units 330 that are provided in the respective power device modules 20; optical fiber cables 40 inserted and installed in the respective optical fiber cable measurement units 330; and a control unit 60 that is connected to one end of the optical fiber cables 40 to measure temperatures.

In this embodiment, differences from the previous embodiment will be described.

The optical fiber cable measurement unit 330 includes a cable mount 331 and 341 and a fiber-optic cable 40. The cable mount 331 and 341 includes an upper cable mount 331 and a lower cable mount 341 which are held together in such a way as to be opened or closed. For example, the upper cable mount 331 and the lower cable mount 341 are held together by a pivotal connecting member 350 such as a hinge about which they swing relative to each other.

The upper cable mount 331 and the lower cable mount 341 are built in the form of a frame with an opening 333 and 343. The upper cable mount 331 may be built in the form described in the second embodiment. The lower cable mount 341 may be built in the form corresponding to the upper cable mount 331. That is, they may be built in the form of a rectangular frame with a plurality of horizontal bars 342a and a plurality of vertical bars 342b, 342c, and 342d.

Cable mounting grooves 346 corresponding to cable mounting grooves 336 of the upper cable mount 331 are formed on the lower cable mount 341.

The fiber-optic cable 40 is inserted and installed between the cable mounting grooves of the upper cable mount 331 and the cable mounting grooves of the lower cable mount 341.

Fourth Embodiment

Figure 10:
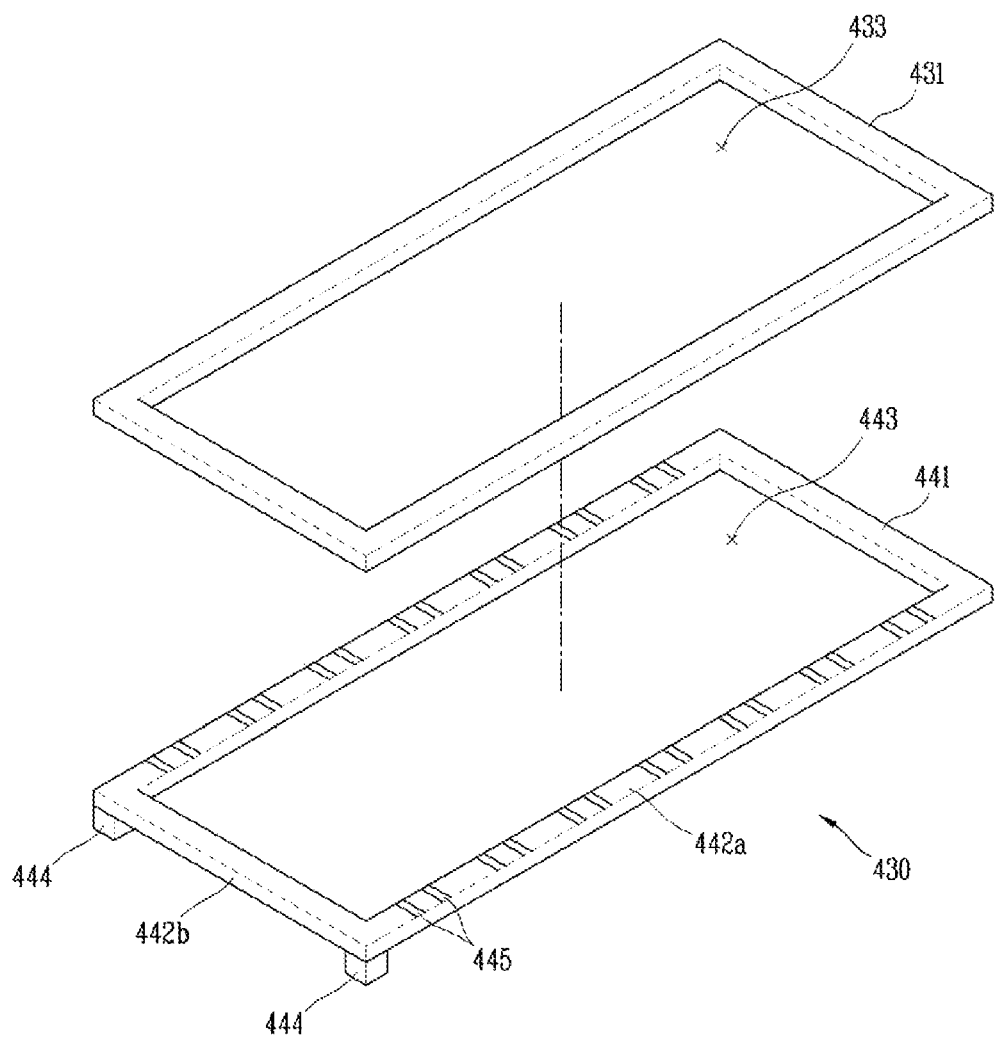
FIG. 10 is a perspective view of an optical fiber cable measurement unit according to a further embodiment of the present disclosure.

FIG. 10 illustrates an optical fiber cable temperature measurement device according to another embodiment of the present disclosure.

The optical fiber cable temperature measurement device includes: a power device 10 provided with a plurality of power device modules 20; a plurality of optical fiber cable measurement units 430 that are provided in the respective power device modules 20; optical fiber cables 40 inserted and installed in the respective optical fiber cable measurement units 430; and a control unit 60 that is connected to one end of the optical fiber cables 40 to measure temperatures.

In this embodiment, differences from the previous embodiment will be described.

The optical fiber cable measurement unit 430 includes a cable mount 431 and 441 and a fiber-optic cable (not shown). The cable mount 431 and 441 includes an upper cable mount 431 and a lower cable mount 441 which correspond to each other in size. For example, the upper cable mount 431 and the lower cable mount 441 are of the same width and length.

The upper cable mount 431 and the lower cable mount 441 are built in the form of a frame with an opening 433 and 443. The upper cable mount 431 may be built in the form described in the first embodiment. That is, they may be built in the form of a rectangular frame with a plurality of horizontal bars 442a and a plurality of vertical bars 442b. The upper cable mount 431 may correspond in size to the lower cable mount 441.

Stoppers 444 are provided on a bottom vertical bar 442b of the lower cable mount 441.

Positional marks 445 where a fiber-optic cable 40 is mounted are formed on the lower cable mount 441 or the upper cable mount 431.

The fiber-optic cable 40 is fixed and installed to where the positional marks 445 are indicated. For example, an adhesive (e.g., a double-face tape or a sticker) may be applied or attached to where the positional marks 445 are present.

Although not shown, the positional marks 445 may be formed in the form of grooves, as in the above-described embodiment.

Fifth Embodiment

Figure 11:
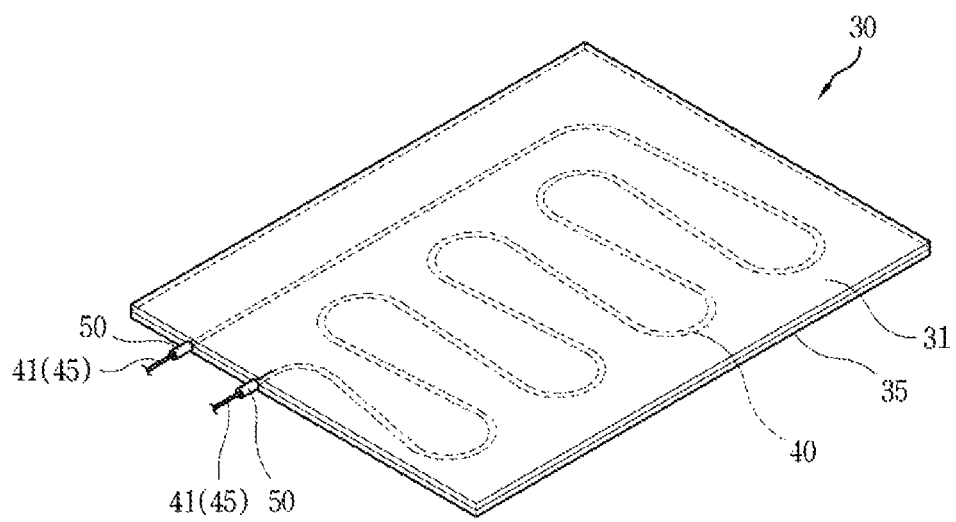
FIGS. 11 and 12 are a perspective view and an exploded perspective view of an optical fiber cable measurement unit according to a further embodiment of the present disclosure.

FIG. 11 illustrates an optical fiber cable measurement unit 30 according to a further embodiment of the present disclosure. The optical fiber cable measurement unit 30 is provided to measure the temperature between the power device module 20 and an adjacent power device module 20. The optical fiber cable measurement unit 30 is disposed in such a way as to have surface contact with one surface (e.g., upper surface) of the power device module 20 or to have a predetermined gap with it, to measure the surface temperature of the power device module 20 or the temperature in the space between battery modules 20.

The optical fiber cable measurement unit 30 may include a pair of panel members 31 and 35, a fiber-optic cable 40, and a connector 50.

The panel members 31 and 35 are provided. The panel members 31 and 35 are provided such that the fiber-optic cable 40 is attached or inserted and installed to them. The panel members 31 and 35 may be made of a board- or film-like thin member.

The panel members 31 and 35 may be provided as a single body where the fiber-optic cable 40 is installed.

Moreover, the panel members 31 and 35 may be arranged side by side as a pair. That is, the panel members 31 and 35 may include an upper panel member 31 and a lower panel member 35.

The panel members 31 and 35 are preferably made of a high thermal conductive material. For example, they may be made of a Teflon sheet.

The panel members 31 and 35 are preferably made in the form of a thin plate. Accordingly, the load on each power device module 20 or the rack 11 may be minimized, and the occupied space may be minimized.

The panel members 31 and 35 are made thin enough to be inserted between adjacent battery modules 20. For example, the panel members 31 and 35 made with a thickness of 3 mm or less. Since the gap between battery modules 20 is small (e.g., 10 mm), the panel members 31 and 35 are made thin so as to be disposed between them.

The fiber-optic cable 40 is provided. The fiber-optic cable 40 is inserted and installed between a pair of panel members 31 and 35. The fiber-optic cable 40 is laid over the surfaces of the panel members 31 and 35. The fiber-optic cable 40 is laid in such a way as to be wound or bent between the pair of panel members 31 and 35. That is, the fiber-optic cable 40 is laid in various shapes such that it is inserted a predetermined length into the panel members 31 and 35. The fiber-optic cable 40 may overlap when bent.

As such, the temperature around the power device module 20 may be measured for each surface through the fiber-optic cable 40 laid on the panel members 31 and 35. As the fiber-optic cable 40 is a line, it may have a plurality of measurement points when laid on the surfaces of the panel members 31 and 35.

Accordingly, the fiber-optic cable 40 is laid in a bent shape to ensure that a plurality of measurement points are provided within the limited area of an upper portion of the power device module 20.

Figure 12:
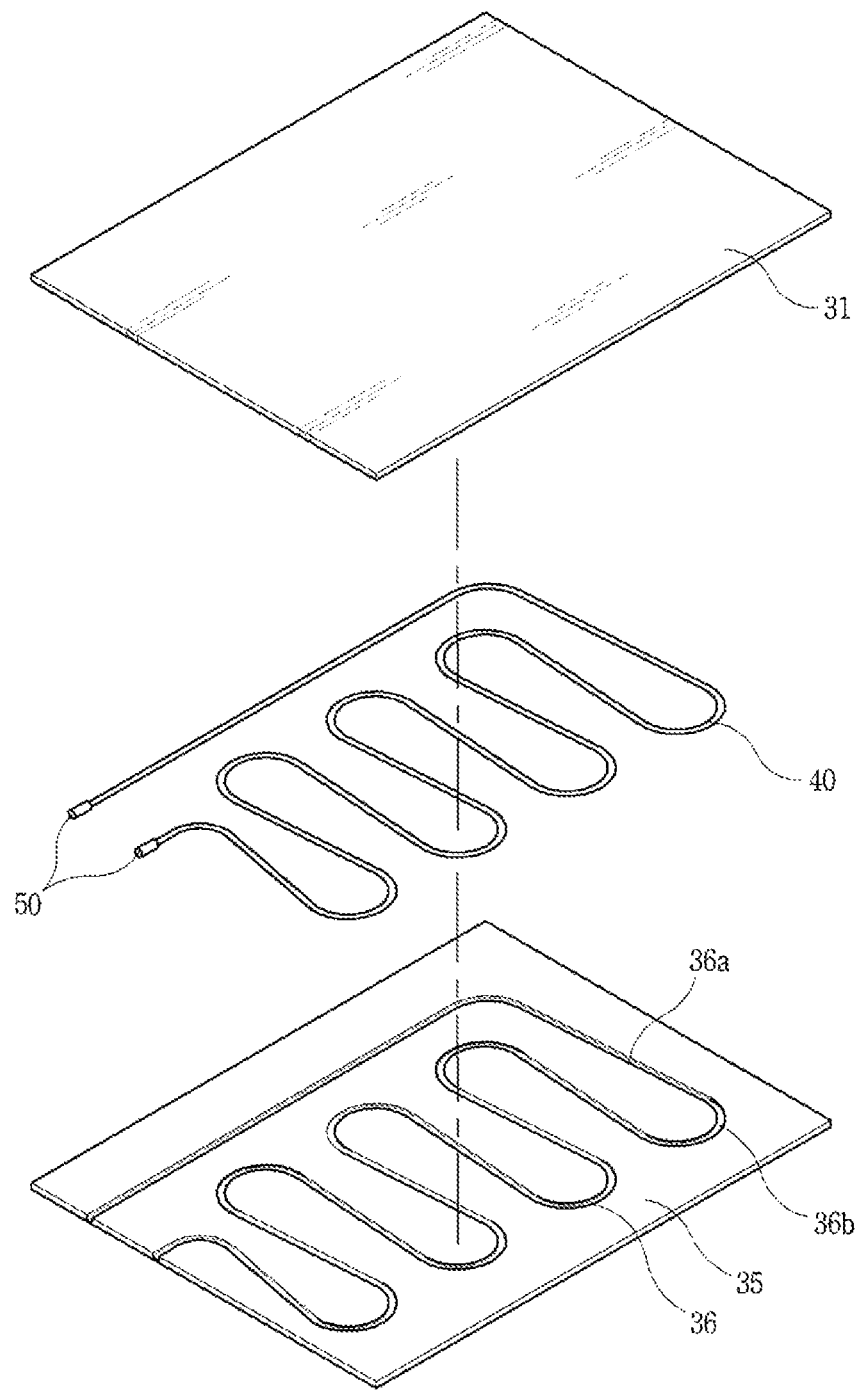

FIG. 12 illustrates an exploded perspective view of the optical fiber cable measurement unit 30.

The panel members 31 and 35 may include an upper panel member 31 and a lower panel member 35.

The upper panel member 31 is made of a thin plate. The upper panel member 31 may be made of a film material.

The lower panel member 35 is made of a thin plate. The lower panel member 35 may be made of a film material.

The lower panel member 35 has an insertion groove 36 formed in it where the fiber-optic cable 40 is inserted and installed. The insertion groove 36 may be formed in a zigzag manner. The insertion groove 36 is formed in a bent shape.

The insertion groove 36 includes a straight portion 36a or a curved portion 36b. Here, the radius of curvature of the curved portion 36b is preferably 20 times as large as or larger than the diameter of the fiber-optic cable 40, considering the material characteristics of the fiber-optic cable 40. In general, the radius of curvature that allows the fiber-optic cable 40 to keep working properly is known to be 20 times as large as or larger than the cross-section diameter of the fiber-optic cable 40.

The fiber-optic cable 40 is inserted and installed into the insertion groove 36 of the lower panel member 35. That is, the fiber-optic cable 40 is laid in the shape of the insertion groove 36. Since the fiber-optic cable 40 is laid in a bent shape on a single surface, it can cover a length required for measurement at a plurality of measurement points, within a given unit area of the power device module 20. The fiber-optic cable 40 is laid longitudinally on the power device module 20, and therefore this ensures that a plurality of temperature measurement points are provided.

The connector 50 is provided on both ends of the fiber-optic cable 40. As the connector 50 is provided on each panel member 31 and 35, the optical fiber cable measurement units 30 may be provided as separate units. Also, the connector 50 may be set as a reference point for temperature measurement (wavelength measurement). Accordingly, it may be set as a reference point of each optical fiber cable measurement unit 30.

A connecting cable 41 and 45 is provided to connect the control unit 60 and the connector 50 or two adjacent connectors 50. The optical fiber cable measurement units 30 may be interconnected by the connecting cable 45.

The control unit 60 may be configured as a DTS server. The control unit 60 is provided to provide wavelength measurements in the fiber-optic cable 40 and convert them into temperatures.

A proper operating temperature may be set on the control unit 60, and an indication or an alert may be issued if this temperature is out of a limited temperature range. For example, a display unit 61 may be provided on a portion of the server of the control unit 60.

Figure 13:
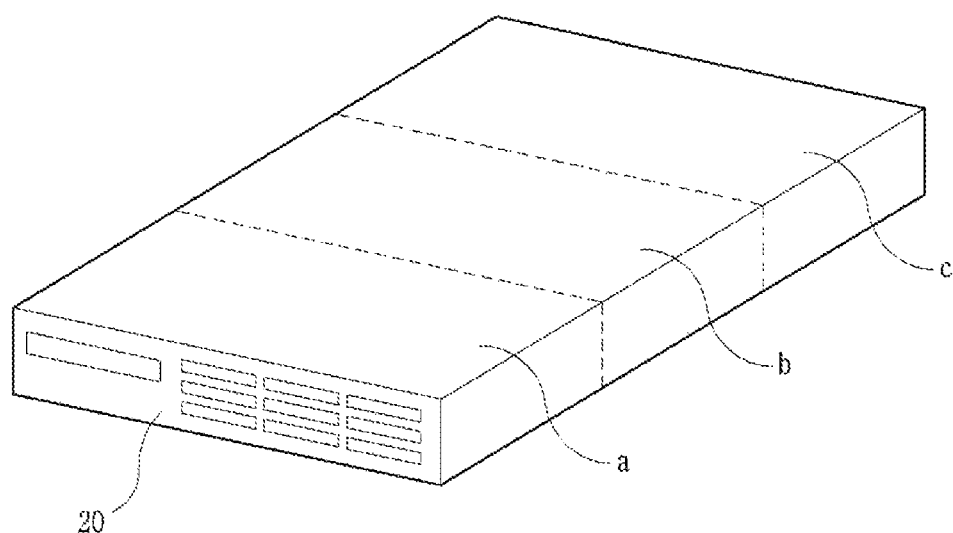
FIG. 13 is a perspective view of a battery module in FIG. 2.

FIG. 13 illustrates a power device module 20. One side (for example, top) of the power device module 20 may be divided into a plurality of sections a, b, and c. The sections may be segments that are defined to physically separate battery cells (not shown) within the power device module 20 by partitions or dividing walls. Alternatively, the sections may be defined by virtually dividing the top of the power device module 20 into a predetermined number of segments. Although FIG. 5 depicts three separate sections by way of example, the number of sections may be set properly as needed.

The fiber-optic cable 40 may have a plurality of measurement points at which the temperatures in the sections a, b, and c of the power device module 20 are measured. The layout of the fiber-optic cable 40 may be determined in such a way that the measurement points are properly disposed on the sections a, b, and c.

Sixth Embodiment

Figure 14:
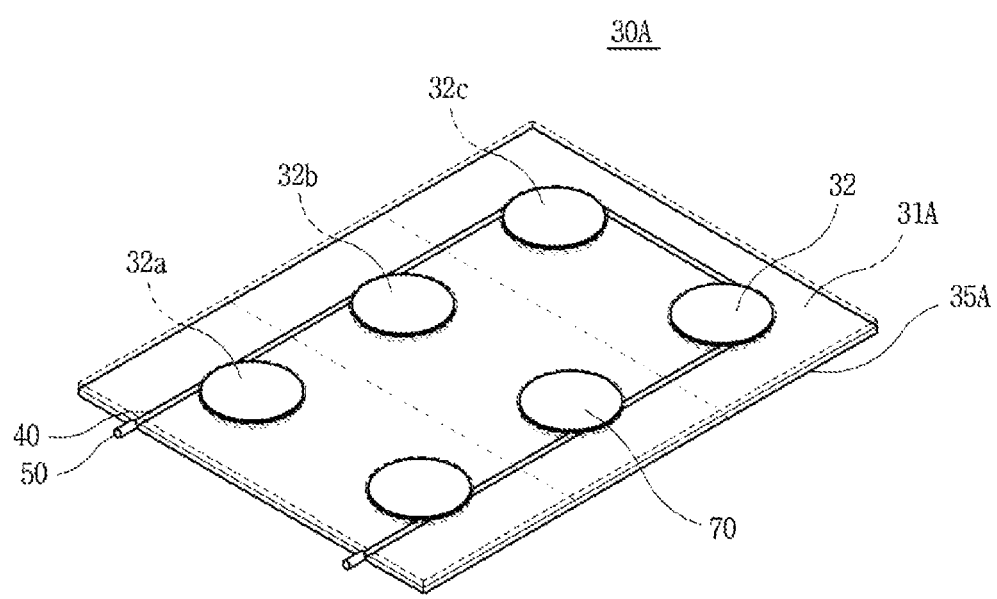
FIGS. 14 and 15 are a perspective view and an exploded perspective view of an optical fiber cable measurement unit according to a further embodiment of the present disclosure.
Figure 15:
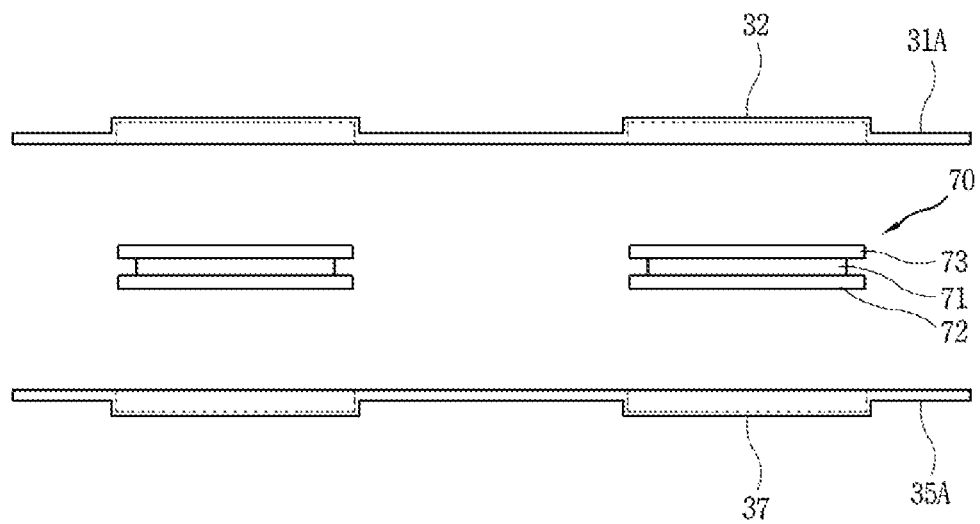

FIGS. 14 and 15 illustrate an optical fiber cable measurement unit 30A according to a further embodiment of the present disclosure.

What applies to the optical fiber cable measurement unit 30 of the previous embodiment equally applies to the optical fiber cable measurement unit 30A of this embodiment, except for some details to be described henceforth.

The optical fiber cable measurement unit 30A may include an upper panel member 31A and a lower panel member 35A and a mounting plate 70.

Mounting plate installation parts 32 and 37 formed as grooves are respectively installed on the panel members 31A and 35A so that the mounting plate 70 is inserted and installed into them. The mounting plate installation parts 32 and 37 may correspond in position or number to the sections a, b, and c of the power device module 20. For example, the upper panel member 31A may have a mounting plate installation part 32a formed in the section a, a mounting plate installation part 32b formed in the section b, and a mounting plate installation part 32c formed in the section c. Also, a plurality of mounting plate installation parts 32 and 37 may be formed in each section a, b, and c. This may mean that each section is subdivided.

The mounting plate 70 may include a wiring groove 71 formed around the circumference. The fiber-optic cable 40 may be inserted and disposed along the wiring groove 71.

Since the mounting plate 70 is inserted and installed into the mounting plate installation parts 32 and 37, it may be disposed to correspond to the sections a, b, and c of the power device module 20.

Flanges 72 and 73 protrude from the top and bottom of the wiring groove 71. The thickness of the flanges 72 and 73 may be equal to the depth of the mounting plate installation parts 32 and 37. The flanges 72 and 73 of the mounting plate 70 may be installed on the mounting plate installation parts 32 and 37 of the panel members 31A and 35A, thereby exposing the wiring groove 71 of the mounting plate 70 between the panel members 31A and 35A.

Figure 16:
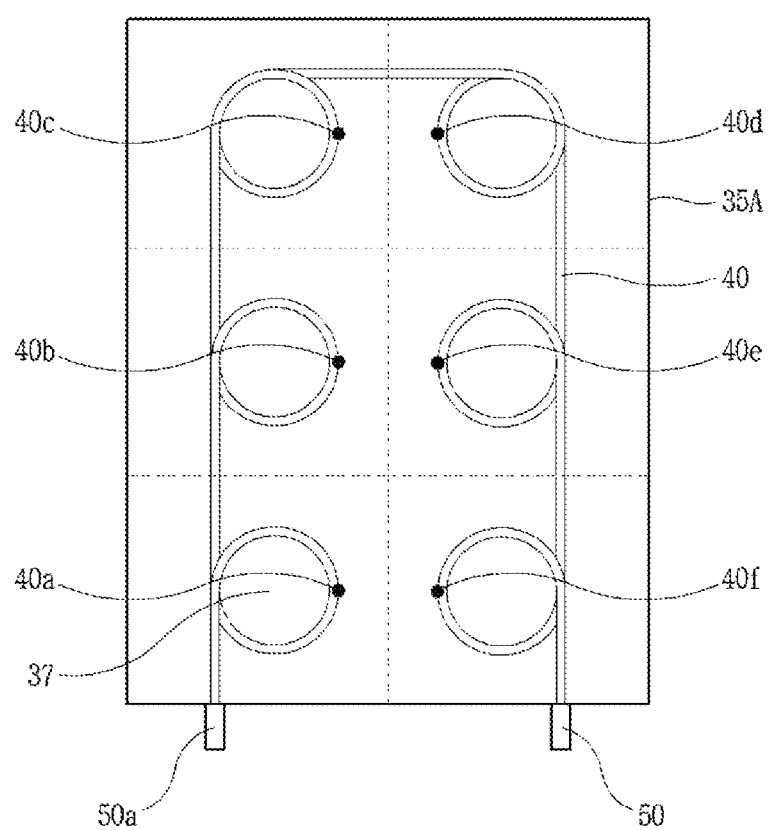
FIG. 16 is a top view of the optical fiber cable measurement unit in FIG. 14 from which the upper panel member and the mounting plate are removed.

FIG. 16 is a top view of the optical fiber cable measurement unit according to the embodiment of FIG. 14 from which the upper panel member 31A and the mounting plate 70 are removed.

The fiber-optic cable 40 is laid in such a way as to be wound along the mounting plates 70 (to have a curved portion or a turnaround portion) in order to cover enough length within a limited area. Measurement points 40a to 40f are set on the fiber-optic cable 40 in order to measure temperatures in each section. The measurement points 40a to 40f may not be physical points, but may be values that are obtained based on a distance that is measured from scattering waves by the control unit 60. An input terminal connector 50a may serve as a starting point of the optical fiber cable measurement unit 30A. The measurement points 40a to 40f may be set at predetermined distances from the starting point. The temperatures in each section are measured from the measurement points. FIG. 8 depicts an example in which temperatures are measured for six sections.

Seventh Embodiment

Figure 17:
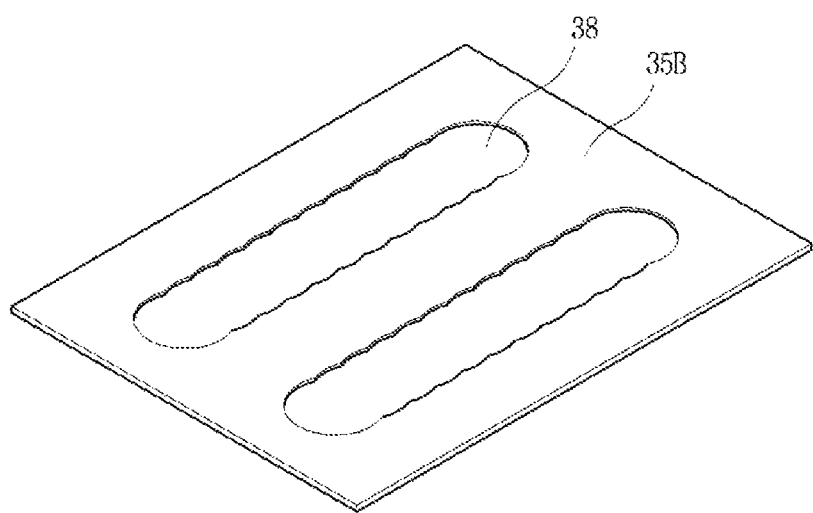
FIG. 17 is a perspective view of a lower panel applied to an optical fiber cable temperature measurement device according to a further embodiment of the present disclosure.

FIG. 17 illustrates another example of the lower panel member 35B. The upper panel member may be built in the same manner as the lower panel member 35B, and they may be symmetrical.

A mounting plate installation part 38 where the mounting plate 70 is installed may be formed in such a way that a plurality of circular grooves are connected. That is, both sides of the mounting plate installation part 38 may be formed in a wavelike pattern. The radius of curvature of the wavelike pattern may be equal to the radius of curvature of the mounting plate 70.

Since a plurality of installation grooves are formed on the mounting plate installation part 38, the mounting plate 70 may be disposed properly depending on the number of sections.

In each embodiment, the panel members 31 and 35 may be made of different materials. For example, the upper panel member 31 may be made of an insulating material, and the lower panel member 35 may be made of a non-insulating material. In this way, the directionality of temperature measurement may be set because heat transfer is blocked by an insulating member. That is, effective thermal control for the energy storage device may be performed since temperature measurement is done on surfaces where the temperature is highest.

According to each embodiment of the present disclosure, it is possible to facilitate temperature measurement for a power device and thermal control by an optical fiber cable measurement unit provided for each power device module.

Moreover, the optical fiber cable temperature measurement device may be applied for each power device module configured in multiple stages, by means of optical fiber cable measurement units.

In addition, since the fiber-optic cable is laid in a bent shape on the optical fiber cable measurement unit, linear temperature distribution may be switched to planar temperature distribution.

Furthermore, temperature measurement may be done by measuring a distance with respect to a connector.

Furthermore, the optical fiber cable temperature measurement device is provided in the form of optical fiber cable measurement units where the fiber-optic cable is mounted, and therefore may be easily assembled and installed in a power device.

Furthermore, the optical fiber cable measurement units make measurements on a per-sheet or per-plane basis, thereby enabling effective control of temperatures between battery modules.

Furthermore, the optical fiber cable measurement units allow for measurement using a fiber-optic cable that is inserted and laid between films (upper and lower panels) that are tightly held together, and therefore provides high measurement accuracy and enables conversion into measurement positions based on distance, thereby facilitating the arrangement and control of the measurement points.

Since the fiber-optic cable is laid on a film surface with a predetermined area, it is possible to secure a radius of curvature required for measurement.

Since the fiber-optic cable is installed in an installation groove or a mounting plate formed (placed) on the film surface, a standardized temperature measurement position distribution can be configured, thereby allowing for efficient temperature management.

Since the upper and lower panels may work in one direction by using an insulating/non-insulating film, the directionality of temperature measurement can be achieved.

Since temperature measurement is possible with respect to a connector provided for each optical fiber cable measurement unit. Thus, measurements may be made at the same points on the upper surfaces of battery modules even if the gap between the battery modules varies.

The embodiments described above are embodiments for implementing the present invention, and various modifications and variations may be made by those of ordinary skill in the art to which the present invention pertains without departing from the essential characteristics of the present invention. Therefore, the embodiments disclosed in the present invention are not intended to limit the technical spirit of the present invention, but to explain, and the scope of the technical spirit of the present invention is not limited by these embodiments. That is, the protection scope of the present invention should be interpreted by the claims below, and all technical ideas within the scope equivalent thereto should be interpreted as being included in the scope of the present invention.

The invention claimed is:

1. An optical fiber cable temperature measurement device comprising:
   a power device provided with a plurality of power device modules;
   a plurality of optical fiber cable measurement units that are provided in the respective power device modules;
   optical fiber cables inserted and installed in the respective optical fiber cable measurement units; and
   a control unit that is connected to one end of the optical fiber cables to measure temperatures,
   wherein each of the optical fiber cable measurement units comprise a cable mount where the optical fiber cable is inserted and mounted,
   wherein the cable mount comprises a mount body built in the shape of a rectangular frame and a crossbar disposed across the mount body, and
   wherein each of the optical fiber cable measurement units is disposed to contact with one surface of the power device module or to have a predetermined gap with the power device module so that each of the optical fiber cable measurement units measures the surface temperature of the power device module or the temperature in a space between power device modules.

2. The optical fiber cable temperature measurement device of claim 1, wherein the cable mount has a plurality of openings.

3. The optical fiber cable temperature measurement device of claim 1, wherein the mount body has a stopper that keeps the cable mount from entering when inserted into the power device module.

4. The optical fiber cable temperature measurement device of claim 1, wherein the cable mount comprises an upper cable mount built in the form of a frame and a lower cable mount built in the form of a frame corresponding to the upper cable mount.

5. The optical fiber cable temperature measurement device of claim 4, wherein the upper cable mount and the lower cable mount are held together in such a way as to swing relative to each other.

6. The optical fiber cable temperature measurement device of claim 4, wherein positional marks where the optical fiber cable is mounted are formed on the lower cable mount or the upper cable mount.

7. The optical fiber cable temperature measurement device of claim 1, wherein the mount body comprises a pair of horizontal bars disposed in parallel and a pair of vertical bars disposed in parallel.

8. The optical fiber cable temperature measurement device of claim 7, wherein the crossbar is disposed in the middle part of the pair of horizontal bars.

9. The optical fiber cable temperature measurement device of claim 7, wherein a plurality of cable fixing grooves are formed on a lower surface of the crossbar for fixing the optical fiber cable.

10. The optical fiber cable temperature measurement device of claim 9, wherein a side cross-section of the cable fixing grooves is shaped like a segment of a circle.

11. The optical fiber cable temperature measurement device of claim 9, wherein the cable fixing grooves are also formed on the vertical bars.

12. The optical fiber cable temperature measurement device of claim 11, wherein the cable fixing grooves formed on the crossbar are parallel to the horizontal bars, and the cable fixing grooves formed on the vertical bars are slanted from the horizontal bars.

13. The optical fiber cable temperature measurement device of claim 1, wherein each of the optical fiber cable measurement unit comprises panel members, and the optical fiber cable is attached or inserted and installed to the panel member.

14. The optical fiber cable temperature measurement device of claim 13, wherein the panel members comprise an upper panel member and a lower panel member, and the optical fiber cable is inserted and installed between the upper panel member and the lower panel member.

15. The optical fiber cable temperature measurement device of claim 14, further comprising mounting plate installation parts that are formed as grooves on the upper panel member and the lower panel member and the mounting plate inserted into the mounting plate installation parts.

16. The optical fiber cable temperature measurement device of claim 15, wherein the mounting plate has a wiring groove formed around a circumference in such a way the optical fiber cable is wound thereabout.

17. The optical fiber cable temperature measurement device of claim 14, wherein the upper panel member and the lower panel member are made of a thin plate or a film.

18. The optical fiber cable temperature measurement device of claim 17, wherein the upper panel member or the lower panel member has an insertion groove formed therein where the optical fiber cable is inserted and installed,
wherein the insertion groove has a straight portion or a curved portion.

19. The optical fiber cable temperature measurement device of claim 18, wherein a radius of curvature of the curved portion is 20 times as large as or larger than a diameter of the optical fiber cable.

20. The optical fiber cable temperature measurement device of claim 14, further comprising a connector coupled to both ends of the optical fiber cable and exposed out of the upper panel member and the lower panel member.

21. The optical fiber cable temperature measurement device of claim 20, further comprising a connecting cable for connecting the control unit and the connector or connecting the power device modules.

22. The optical fiber cable temperature measurement device of claim 20, wherein each of the power device modules is divided into a plurality of sections, and measurement points are set on the optical fiber cable at predetermined distances from the connector.

* * * * *